Sept. 7, 1965

P. C. HOFSTRA ETAL 3,204,632

INTRAVENOUS VALVE DEVICE

Filed Aug. 14, 1961

INVENTORS
PETER C. HOFSTRA
HARVEY J. ENGELSHER
BY
James P. Malone

United States Patent Office 3,204,632
Patented Sept. 7, 1965

3,204,632
INTRAVENOUS VALVE DEVICE
Peter C. Hofstra, Paterson, N.J., and Harvey J. Engelsher, Yonkers, N.Y., assignors to Sterilon Corporation, Buffalo, N.Y., a corporation of Delaware
Filed Aug. 14, 1961, Ser. No. 131,237
2 Claims. (Cl. 128—214)

This invention relates to a novel and simple plastic valve for intravenous injection of various types of blood constituents, whole and derivated form.

It is the object of this invention to provide an efficient and simplified valve device for use in intravenous injection for the purpose of enhancing the safety of the clinical administration into the blood system. In particular, the object of this invention is to provide a mechanical valve, an essential component of which is a flexible, compartmented, and highly permeable film barrier that will allow the ready diffusion of entrapped gases prior to their entrance into the corporeal system. A still further object of this invention is to provide an automatic shutoff and metering arrangement that will permit the use of the valve in intravenous administrations with enhanced safety and also without the need of personal attention.

This invention pertains to the use of thin plastic membranes compartmented in such a manner that the flow of the intravenous fluid can be divested of the embolic, entrapped gases in a small collecting head or removed by diffusion through the membrane wall. The principal component of this invention is a flexible plastic film, shaped and constructed to provide for this collection and removal of embolic, undissolved or otherwise unreacted gases. The present invention preferably uses a chemically inert plastic film prepared from polytetrafluoromethylene which is noted for its chemical inertness, biological inertness, heat resistance, and flexible durability. In addition, the film of polytetrafluoroethylene possesses a unique quality of low adhesion, thereby precluding the clogging of the film during the infusion and additionally allowing a very rapid fluid flow through the valve owing to the unique low frictional properties of polytetrafluoroethylene. Additionally, the valve compartment is constructed of polytetrafluoroethylene of sufficient thinness and porosity to permit a high rate of gaseous escape from the blood while at the same time permitting a high degree of oxygenation.

In the valve assembly described in this invention, it was discovered that the thin polytetrafluoroethylene valve compartments had additionally demonstrated a low coefficient of friction which allowed a very rapid flow of ingested blood that was considerably faster than that attainable by any other type of synthetic or natural film. It was also discovered that the surface friction of the ultrathin membrane was so small that there was no evidence of any adhesion or entrapment of blood constituents as the blood flowed between the valve walls. It was also discovered that the surfaces of the polytetrafluoroethylene valve membranes were endowed with some microscopic topographical features that aided in the natural diffusion or escape of embolic gas.

The valve described in this invention can be constructed of a variety of polymeric membrane materials that include polyethylene, cross-linked polyethylene, polypropylene, and natural and synthetic rubber, as well as polytetrafluoroethylene hexafluoropropylene and fluorinated ethylene propylene copolymer. To a degree, the operating features of this invention are effected by any one of these membrane types. However, that with polytetrafluoroethylene has been considered most suitable for clinical use by virtue of the chemical resistance and in particular by the absence of any processing aids such as may contribute to their extraction and ultimate residence in vital biological or organic regions. Moreover, the processing methods for preparing membranes from polytetrafluoroethylene as described in U.S. Patent 2,852,811 make this particular polymer particularly valuable for the valve device of the present invention.

This valve has been developed and adapted primarily to reduce and eliminate the danger of embolic introduction of undissolved oxygen or other atmospheric components during the intravenous introduction of blood and other clinically necessary vascular additives. The embolic danger involves the introduction of a thrombus or clot, either in gaseous or solid form, which has become detached from some place of origin either extracorporeally or intracorporeally and then circulating freely in the blood stream until it reaches a vessel to which it is too small to pass. Thus an embolism on the arterial side of the heart, such as may originate in some chronic vascular disease, will lodge in one of the systemic arteries of the body. On the venous side, an embolism, usually arising in some area of infection or from some artifact in the intravenous administration that may include microscopic debridement from the commercial container sources will pass into the heart, and thence to the arteries of one or both lungs. In either case the result is similar causing a cut-off of the blood to the area and unless adequate alternative flow channels are available, either at the time or in the course of a few days, death, or gangrene of the area, results. In the case of large arteries to such organs as kidneys, brain and heart, there is no possibility of such collateral circulation from the outset and the condition known as infarction results. Embolism may be brought about by other means than natural blood clot. These may be artifacts emanating within the clinical containers or in particular may be due to the entrapment of undissolved air when accidentally sucked into the veins. The exact nature of the air embolism may be simple in some cases but in other instances it may be complex. In the complex or latter case an embolic nuclei may in fact be encapsulated microscopically by certain dehydrated components in the blood which have not adequate time for disintegration in passage from clinical bottles through tubes and finally through appropriate intravenous inlets. Whatever may truly be the cause of such an artifact, the present invention provides a valve device that allows for the collection of the emboli either in nucleated or otherwise aggregated form into a separate compartment which then can allow diffusion through the membrane into the atmosphere.

Accordingly, a principal object of this invention is to provide a novel, simplified valve for separating likely undissolved gases prior to their injection into the vascular system.

Another object of the invention is to provide a self-metering or self-correcting arrangement whereby the intravenous injection can operate by itself under automatic hydrostatic influences.

Another object of the invention is to provide a compartment for separated undissolved gases that can diffuse out of the separated blood layer into the atmosphere.

These and other objects of the invention will be apparent from the following specification and drawings, of which FIG. 1 is an elevational view of an embodiment of the invention.

Figure 1:
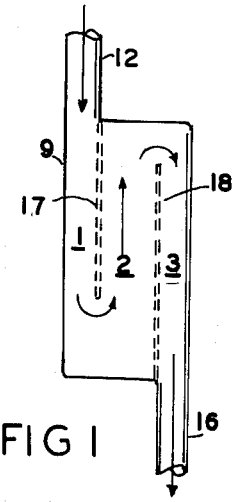
FIG. 1A is a side view of the embodiment of FIG. 1.
Figure 1A:

FIGS. 1 and 1A show the hydrostatically automatic valve of thin plastic membrane bag 9 with partitions 17 and 18 forming three essential compartments that include a hydrostatic compartment 1, an intermediate de-embolizing chamber 2 and hydrostatic channel 3 to the vascular system. In this arrangement, the middle compartment 2 provides a collection point for all nucleated emboli as well as any artifacts or debridements to collect topically while the principal embolically-free intravenous adjuvant is allowed to proceed through the intravascular channel 3. The function of the free space in compartment 2 is to provide not only for the collection of such undesired and clinically dangerous emboli but also to permit the gradual diffusion of the undissolved gases through the membrane container into the atmosphere, thus providing a gradual release of such gases. Moreover, in this arrangement the use of extreme thin plastic or polymeric and particularly that of heat sterilizable film of polytetrafluoroethylene allows for the transpiration of the blood gases according to the chemical driving forces for which the blood system is constituted. In other words, this valve arrangement also acts as an oxygenation system while at the same time permitting the release through the membrane of carbon dioxide and other expelling blood gases. During actual observation, with the provision of this free space 2 in between the hydrostatic compartment 1 and the channel 3, the collection of any gaseous components can also be seen to vary considerably depending upon the particular samples of blood that is used for the infusion. The rather remarkable feature of this invention is the discovery of the wide variation of the embolic contents, largely of a gaseous nature, in the various blood samples that have been used. Thus, the automatic valve of this invention serves therefore to correct this wide variation in whole blood in so far as its undissolved gases are concerned and thereby restore these to a minimum level and particularly to a uniform, constant, and dependable replication.

Figure 2:
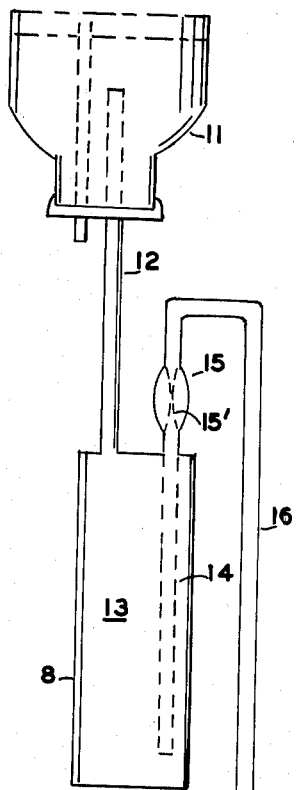
FIG. 2 is a schematic diagram illustrating the use of the invention.

FIG. 2 describes schematically the entire arrangement employing the transference of whole blood from a stored bottle source through the valve and then to the vascular system of a patient. In this arrangement the whole blood emerges from the storing container 11 through a measuring tube 12 into the hydrostatic compartment 13 made of a compressible plastic tube which can also act as a primary source for correction of gross entrapment of air, following which the blood passes through the de-embolizing channel rising to a collapsible plastic valve 15 where additional diffusion of undissolved gases can take place, and then proceeding into the hydrostatic channel 16 through a conventional drip control valve 6 which permits the ready accounting of the flow rate into the patient, and finally to the needle 9 in the vein 7 of the patient. This arrangement provides a clinically simple administration of not only whole blood but other correcting vascular liquids. The entire valving system is incased in a flexible plastic tube 8 of sufficient transparency that the progress of the correction and valving can be watched quite readily.

In operation when the fluid in the bottle 11 falls to the top of the tube 12 and when tube 12 drains down to its bottom the hydrostatic pressure will collapse the valve 15, as shown by dotted lines 15′.

The valve 9 of FIG. 1 may be substituted for the valving components 8, 14 and 15 of FIG. 2. The valve 20 FIG. 3 may also be substituted in FIG. 2. The valves of FIGS. 1 and 3 operate by collapsing the plastic bag when the hydrostatic pressure from the bottle 11 is lowered sufficiently, that is, when the fluid level in the bottle drops to the level of the tube 12 and the tube 12 drains sufficiently to lower the hydrostatic pressure on the input side of the valve member. Automatic cut-off valve systems of this type are described in detail in our copending application for Volumetric Automatic Shut-Off Fluid Valve, S.N. 125,526 filed July 20, 1961.

Figure 3:
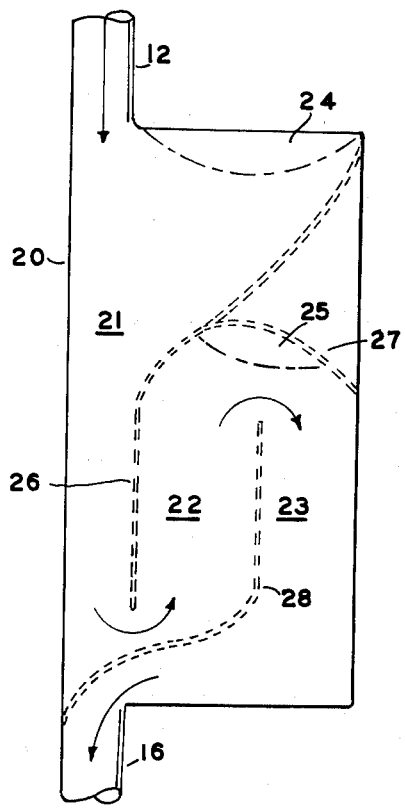
FIG. 3 is an elevation view of another embodiment of the invention.
Figure 3A:
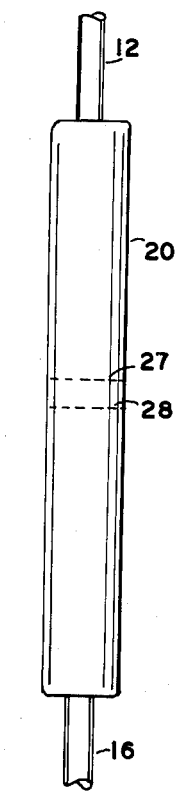
FIG. 3A is a side view of the embodiment of FIG. 3.

Another simplified version of the valving device, which is particularly suited for clinical assessment of undissolved gases, is shown at about twice actual size in FIGS. 3 and 3A. This is constructed of a bag 20 of the above mentioned thin flexible plastic material in which the compartments are formed by partitions 26, 27, 28 by simple heat sealing or heat stamping of the sides of the bag together. It is particularly valuable as a single-use valving device which can be discarded following intravenous administration so as not to be used under conditions that would lead to introduction of foreign contaminants. In this arrangement the whole blood or the administered blood fluid flows into the primary reservoir 21 which acts as a hydrostatic head and additionally as a free board for collection of gases, merging into an internal compartment 22 in which an additional collection of embolic gases can take place and be rapidly removed to the atmosphere by diffusion, and into the channel 23 to the vascular site. This arrangement has enabled us to develop some valuable data in regard to the embolic content, the results of which are summarized as follows:

| Blood Administration | Blood Density | "Free" Gas, Volume Percent |
| --- | --- | --- |
| (A) Direct from storing container | 1.060 | 0.8 |
| (B) Through valve of Figure 3 | 1.065 | 0.06 |

In the above tabulation are listed the comparative data on blood density and the "free" gas in volume percent obtained by a direct injection from storing container as compared to that passing through the valve of FIGURE 3. The blood density measurements were made by suspending small droplets of the blood in a density gradient tube capable of measuring densities from .92 up to 1.12 employing mixtures of halogenated carbons. The free gas volume was determined by withdrawing samples of the blood obtained from the two above sources and centrifuging these in a tube in such a manner that the free gas can be measured following the centrifugation by manometric means. It is significant to note here that the blood density has increased consistently with the decrease in the free gas volume of the blood that passed through the valve constructed according to the schematic illustration of FIGURE 3. This strongly suggests that the valve arrangement has enabled the blood to divest itself of some of the free gas which could be an embolic risk as that blood entered into the vascular system. These data represent only one of a number of comparative tests on density and gas volume from various samples of stored whole blood which in themselves have had variations in blood density and free gas volume. There have been instances of course where the valve arrangements did not provide any difference in the blood density and the free gas volume, thus indicating that the blood itself was probably less contained with the embolic gas. Nevertheless, this invention provides a valve that assures the correction of the blood to the minimum embolic dangers possible inasmuch as the natural sources of blood can be for rather obvious reasons varying in quality depending upon the source, the storage and aging characteristics, and finally some individual blood component that may actually cause the gradual accretion of free gas volumes.

To illustrate the valuable de-gassing aspects of this valve, a sample of stored whole blood was percolated with dry atmosphere air at room temperature for 30 minutes using a glass tube with a bore diameter of 1 mm. This blood was similarly passed through a simulated vascular system employing (a) a straight injection scheme as normally practiced clinically and (b) the same scheme but with an intervening valve arrangement such as shown in FIGURE 3. The following tabulation illustrates the essential improvement in the blood constituent as it is permitted to go into the vascular system:

| Blood Administration | Blood Density | Free Gas Volume (percent) | Residence Artifact in Inlet (percent) |
|---|---|---|---|
| (A) Direct from storage container | 1.068 | 2.4 | |
| (B) Through valve of Figure 3 | 1.067 | 0.08 | 3.4 |

From this tabulation it is interesting to note that although the blood density underwent a slight change nevertheless the free gas volume has been reduced from 2.4 to 0.08% thus enhancing the clinical safety of the blood that transpired through the valve of FIGURE 3. Of significant interest is the residue or artifact that has been collected in the blood in the de-embolizing chamber that amounts to approximately 3.4%. These artifacts are regarded as being a likely thrombus clot that could have disastrous effects in the vascular system. They accumulated in the deaeronating chamber in FIGURE 3 both in the upper and lower compartments 24 and 25. Apparently they were parts of the nuclei around the gaseous emboli that were allowed to drift to the top of these compartments and only allowing the nonclotting or nonclotted blood constituents to pass into the intravenous system.

In actual clinical application using the valve based on FIGURE 3, animal tests of infusion have been traced by making the thermalgraphs on animals with the control nonvalved infusion compared against the valved infusion based on the components of this invention. It has been statistically evident that the thermograph profile with the valve construction has always been consistently constant whereas that using the direct infusion from the storage container gave periodic fluctuations in body temperature that have followed an extremely erratic pattern. This illustrates then that the removal of some of the debris in these compartments has served to level out the normal body thermographs and thus emphasizing the particular value of the valve construction.

The valve itself as mentioned previously can be made from a variety of plastic compositions or films. There are basically only two requirements that pertain to this invention insofar as the film properties are concerned and they are (A) high degree of flexibility coupled with ready or easy heat sealing into the compartments described in FIGURE 1, 2, and 3, and (B) complete elimination of any artifacts in the film that may give rise to pyrogenic or embolic type of debris that would be brought into the blood streams and additionally must remain flexible, pliable and nonadherent. The latter would exclude plasticizers, stabilizers, lubricant agents and a host of other additives that are often added to improve processibility or some singular mechanical property of the film. With due regard for such contaminants or additives, the valve can be made from these materials. However, in the interest of complete clinical safety, the preferred valve construction material is that based on polytetrafluoroethylene both as the homopolymer and as the copolymer, which are technically known as "Teflon" TFE-fluorocarbon polymers and FEP-fluorocarbon polymers. The latter is particularly suited by virtue of its being a melt processible polymer and thus it can be heat sealed into the compartment constructions quite readily. The valves are also made from thin enough materials that they can be distended and allowed to fluctuate with the hydrostatic variations that emanate during the course of the infusion into the vascular system. Additionally, the TFE and FEP fluorocarbon materials are chemically inert and non-adhesive as well as autoclavable making them entirely suitable for clinical applications. The simplicity of the valve and the need for relatively small amount of the film makes this invention particularly suited for applications that can be used once and then discarded in the interests of obviating any clinical complications that may arise from re-use.

Although the invention has been described in detail, these have been by way of explanation rather than limitation. Many modifications are possible, including supporting constructions using other less flexible materials of construction such as glass and stainless steel, are possible without departing from the spirit of invention.

We claim:

1. A hematological valve device for the gaseous treatment of blood in a gravity flow system, comprising
    a flexible gas-permeable fluid-impermeable bag having vertical opposite sides disposed in flat-folded condition, said bag including first and second generally vertical edges and upper and lower cross edges joining said first and second edges,
    first portions of the opposite sides of said bag being heat-sealed together by a continuous first seam extending downwardly from a point at said upper edge adjacent said second vertical edge initially angularly outwardly from said second edge in the direction of said first edge, and subsequently downwardly parallel with and spaced from said lower edge and cooperating with said first vertical edge to define therebetween a first generally vertical hydrostatic channel, second portions of the opposite sides of said bag being heat-sealed together by a continuous second seam extending upwardly from a point at said lower edge adjacent said first edge initially angularly outwardly toward said second edge between and spaced from the lower end of said first seam and said lower edge, and subsequently upwardly between and spaced from said first seam and said second vertical edge, the upper end of said second seam being spaced from said first seam, whereby said second seam defines a second generally vertical hydrostatic channel adjacent said second vertical edge, and an intermediate chamber between and in communication at its lower and upper ends with said first and second channels, respectively, said bag including at its upper edge an inlet communicating with said first channel, and at its lower edge an outlet communicating with said second channel,
    the walls of said bag being of a thinness to cause collapse of the bag to interrupt communication between the inlet and outlet when the hydrostatic head in the first channel is lowered beyond a given valve.

2. The device as defined in claim 1 wherein the bag is formed from the group consisting of polytetrafluoroethylene, hexafluoropropylene, fluorinated ethylene propylene, polyethylene, cross-linked polyethylene, polypropylene, and natural and synthetic rubber.

References Cited by the Examiner

UNITED STATES PATENTS

| 220,559 | 10/79 | Wilson | 251—5 X |
| 2,156,313 | 5/39 | Schwab | 128—214 |
| 2,597,699 | 5/52 | Bauer | 128—214 |
| 2,827,081 | 3/58 | Little | 128—214 X |
| 2,969,063 | 1/61 | Broman | 128—214 |
| 2,972,349 | 2/61 | De Wall | 128—214 |
| 3,056,403 | 10/62 | Gewecke | 128—214 |

FOREIGN PATENTS

| 844,881 | 8/60 | Great Britain. |

OTHER REFERENCES

Gentsch et al.: "Experimental and Clinical Use of a Membrane Oxygenator" from Surgery, vol. 47, No. 2, February 1960 (pp. 301–313).

RICHARD A. GAUDET, *Primary Examiner.*

RICHARD J. HOFFMAN, *Examiner.*

UNITED STATES PATENT OFFICE
CERTIFICATE OF CORRECTION

Patent No. 3,204,632                                   September 7, 1965

Peter C. Hofstra et al.

It is hereby certified that error appears in the above numbered patent requiring correction and that the said Letters Patent should read as corrected below.

Column 1, lines 34 and 35, for "polytetrafluoromethylene" read -- polytetrafluoroethylene --; column 5, line 46, for "FIGURE" read -- FIGURES --; column 6, line 47, for "valve" read -- value --.

Signed and sealed this 22nd day of March 1966.

(SEAL)
Attest:

ERNEST W. SWIDER                                  EDWARD J. BRENNER
Attesting Officer                                      Commissioner of Patents